United States Patent [19]

Goto et al.

[11] Patent Number: 5,549,095

[45] Date of Patent: Aug. 27, 1996

[54] POWER TRAIN HAVING SUPERCHARGED ENGINE

[75] Inventors: Tsuyoshi Goto, Hiroshima; Hiroyuki Sugimoto, Hiroshima-ken, both of Japan

[73] Assignee: Mazda Motor Corporation, Hiroshima-ken, Japan

[21] Appl. No.: 312,945

[22] Filed: Sep. 30, 1994

[30] Foreign Application Priority Data

Sep. 30, 1993 [JP] Japan .................................. 5-245057
Jul. 30, 1994 [JP] Japan .................................. 6-197400

[51] Int. Cl.$^6$ .......................... F02B 29/08; F02D 13/02; F02D 23/00
[52] U.S. Cl. ........................ 123/559.1; 123/316
[58] Field of Search ........................ 123/559.1, 564, 123/316

[56] References Cited

U.S. PATENT DOCUMENTS

| | | | |
|---|---|---|---|
| 4,958,606 | 9/1990 | Hitomi et al. | 123/559.1 |
| 5,033,268 | 7/1991 | Hitomi et al. | 123/559.1 |
| 5,121,733 | 6/1992 | Goto et al. | 123/559.1 |
| 5,230,320 | 7/1993 | Hitomi et al. | 123/559.1 |
| 5,239,960 | 8/1993 | Sasaki et al. | |
| 5,396,874 | 3/1995 | Hitomi et al. | 123/559.1 |

FOREIGN PATENT DOCUMENTS

| | | |
|---|---|---|
| 0269125 | 6/1988 | European Pat. Off. |
| 2544766 | 4/1977 | Germany . |
| 63-51121 | 4/0688 | Japan . |

OTHER PUBLICATIONS

"Concepts—Japanese 'Miller–cycle' Engine Development Accelerates", Automotive Engineering, 101, Jul. 1993, No. 7, Warrendale, PA, pp. 76 and 79–81.

Honda Accord Service Manual 1989, © Honda Motor Company, Ltd. 1988, pp. 3–14.

*Primary Examiner*—Michael Koczo
*Attorney, Agent, or Firm*—Keck, Mahin & Cate

[57] ABSTRACT

A power train has an engine, such as a multi-valve, double overhead camshaft engine, which is equipped with a mechanical supercharger and an intercooler, and a transmission operationally coupled to the engine. The engine, which is adapted to provide the maximum output according to the maximum supercharge volume of the mechanical supercharger, has an intake valve closing time which is retarded more than 65 degrees of a crank angle after bottom dead center on an intake stroke and a maximum speed for the maximum output of less than 6,000 rpm. The transmission provides, in its highest gear, the power train with a total reduction ratio in a relatively small range of 2.1 to 2.8.

26 Claims, 6 Drawing Sheets

POWER TRAIN HAVING SUPERCHARGED ENGINE

BACKGROUND OF THE INVENTION

1. Field of the Invention

The present invention relates to a power train having a multi-valve double overhead camshaft (DOHC) engine equipped with a mechanical supercharger and a transmission.

2. Description of Related Art

In order to increase the amount of air to be forced, under pressure, into an engine and thereby increase engine output torque, engines are typically equipped with superchargers. In addition, there have been known what are called Miller cycle engines in which closing of intake valves is retarded greatly after bottom dead center so as to make an effective compression ratio smaller than an expansion ratio, thereby reducing the work required for compression and reducing pumping loss. In recent years, it has been proposed to use this kind of method in engines equipped with superchargers and intercoolers with the aim of controlling knocking and boosting engine output torque. Such a Miller cycle engine is known, for instance, from Japanese Unexamined Utility Model Publication No. 63-51121.

The engine described in the above-mentioned publication has double overhead camshafts and is equipped with a supercharger and an intercooler provided in an intake passage. The time at which intake valves close is retarded later than 70° after bottom dead center. With this engine, a reduction in effective compression ratio provides the effect of lowering the temperature at top dead center of the compression stroke so that knocking and temperature rise of exhaust gases are controlled. Under these controlled conditions, the supercharging volumetric efficiency is increased and engine output torque is effectively increased.

Engine output is transferred to wheels of the vehicle via a power transfer device, including a transmission and a reduction gear which are constituent elements of a power train, as well as an engine. Power trains installed in conventional passenger cars and the like, even if they include supercharged engines, have overall gear ratios of about 3.15 for the highest gears of the transmission, i.e., those having the smallest gear ratios. These power trains have maximum speeds of no less than 6,500 rpm. for a maximum engine output. In DOHC engines, in particular, because the DOHC mechanisms provide improved valve lifting performance at high speeds, the engines have increased maximum speeds so as to attain horsepower.

Conventional power trains of this kind achieve high engine output but provide poor fuel economy and have room for improvement in terms of noise, reliability and the like.

SUMMARY OF THE INVENTION

It is an object of the present invention to provide a power train including an engine equipped with a mechanical supercharger that secures power train output and maintains good driving performance while providing greatly improved fuel economy, through increased engine output torque and lowered engine speed, and boosting reliability.

The object of the present invention is achieved by providing a power train having a power transfer line and an engine, which is desirably equipped with double overhead camshafts, cooperating with a mechanical supercharger and an intercooler disposed in an intake line. The engine is designed and adapted to have a time for closing intake valves no earlier than a crank angle of 65° after bottom dead center and a maximum engine speed no greater than 6,000 rpm for a maximum output. The detailed engine specifications are set so that the maximum engine output accords to a maximum volume of charge of the mechanical supercharger. Further, the power transfer line is designed and adapted to have an overall gear ratio between 2.1 and 2.8 for the highest gear of the transmission coupled to the engine.

If the mechanical supercharger is, as is preferable in a power train of this invention, of an internal compression type, the engine is adapted to have a geometrical compression ratio or mechanical compression ratio (i.e., as determined by mathematical calculation from a fixed volume) of no less than 8.5. It is desirable for the engine to have a displacement of no greater than approximately 2,500 cc and, in addition, to be provided with a plurality of intake ports for each cylinder.

Furthermore, a desirable engine for the power train of this invention is one that has a plurality of intake ports and a plurality of exhaust ports on each cylinder, with the total area of the intake port openings being larger than the total area of the exhaust port openings. In addition, it is effective for the power train of this invention to include a transmission having a gear ratio which, when the transmission is in the highest gear, is less than 1.0.

With the power train of the present invention, knocking is controlled due to a retarded timing of closing the intake valves and a reduction in effective compression ratio. The engine output torque is increased, particularly effectively at low engine speeds, through supercharging performed by a mechanical supercharger. Furthermore, while the engine output torque is thus increased, the power train is adapted to have an overall reduction ratio which is appropriately reduced and a decreased maximum engine speed, thereby achieving driving conditions which are beneficial to fuel economy and the like while maintaining a desired maximum output. In other words, as will be explained in detail hereinafter in connection with a preferred embodiment, when compared with conventional models, the engine operating region which achieves equivalent driving or traveling conditions shifts toward the side of lower speeds and high torque. This is beneficial in terms of fuel economy. Furthermore, due to the use of lower speed engines, beneficial effects are achieved in terms of noise reduction and improved reliability.

In the power train of the present invention, an internal compression type of mechanical supercharger provides adequately increased pressure. In addition, engines having geometrical compression ratios of no less than 8.5 attain favorable expansion ratios and, due to a retardation of closing the intake valves, appropriate effective compression ratios, leading to a more profitable effect in increasing output torque.

When the engine has a displacement of no greater than 2,500 cc, benefits are achieved in terms of fuel economy, while an engine output comparable to an engine having a large displacement can be obtained by a high volume of supercharge. In addition, when the engine has a plurality of intake valves on each cylinder, intake air resistance during a high volume of supercharge is reduced due to the increased area of intake openings compared with engines provided with only one intake port on each cylinder, so that a high volume of supercharge is beneficial in terms of boosting torque. In this case, when the engine has a plurality of exhaust ports, in addition to a plurality of intake ports, on each cylinder having a total area of openings which is larger than that of the intake ports, intake air resistance is more effectively reduced.

Furthermore, when the engine used in the power train of the present invention is of a type having double overhead camshafts, freedom in laying or positioning the intake and exhaust valves is increased, so as to enable the intake ports and intake valves to have shapes and angles favorable to a reduction in the resistance of air flow at the intake port openings, thereby achieving a beneficial effect in terms of reducing intake resistance during a high volume of supercharge.

The power train having a transmission with a highest gear which has a gear ratio of less than 1.0 prevents a terminal reduction ratio from being excessively small, even if the transmission coupled to the engine has a highest gear with an overall gear ratio which is between 2.1 and 2.8.

BRIEF DESCRIPTION OF THE DRAWINGS

The above and other objects and features of the present invention will be clearly understood from the following description of a preferred embodiment thereof when considered in conjunction with the accompanying drawings, in which.

DESCRIPTION OF THE PREFERRED EMBODIMENT

Figure 1:
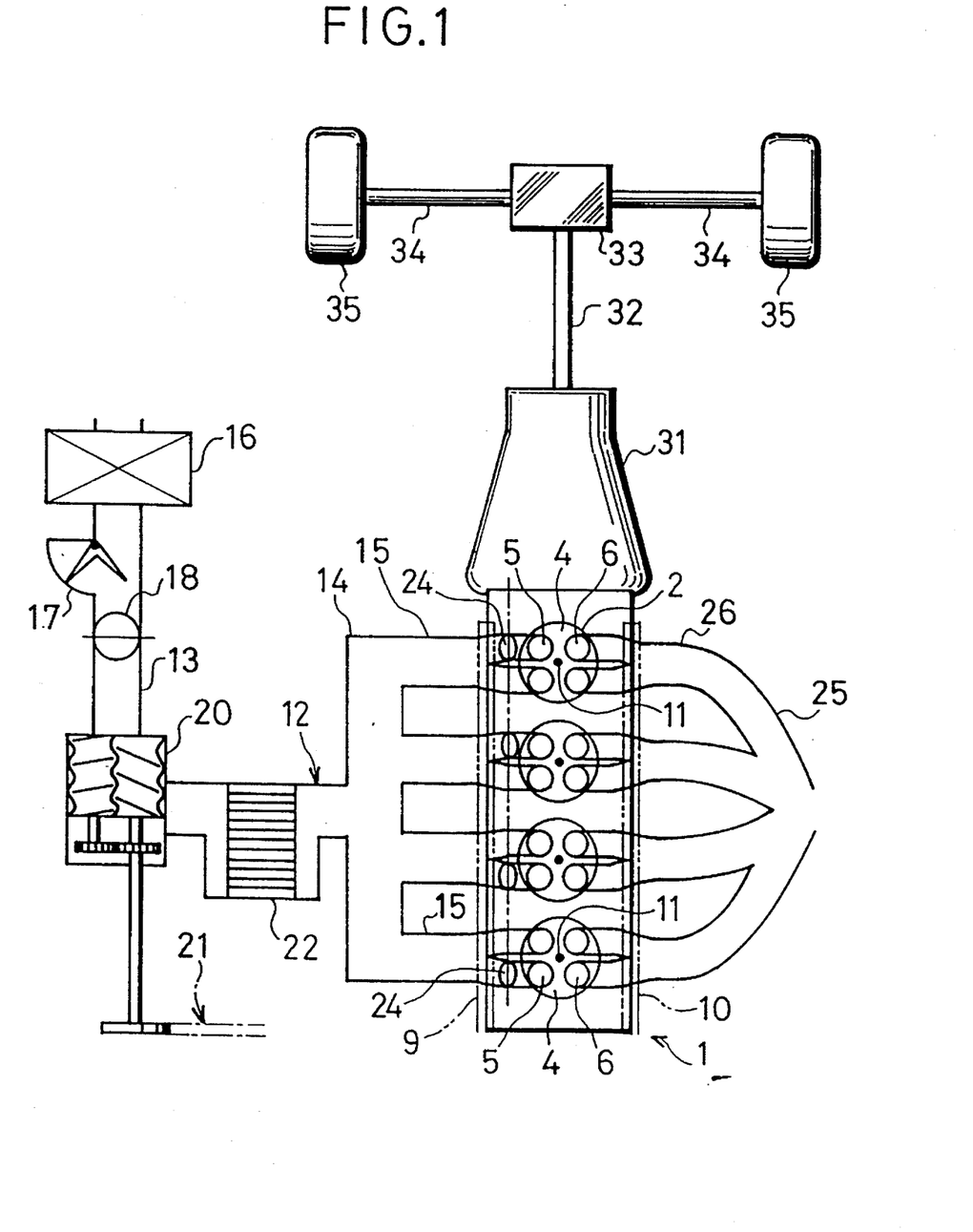
FIG. 1 is a schematic plan view of a power plant equipped with a supercharged engine in accordance with a preferred embodiment of the present invention.
Figure 2:
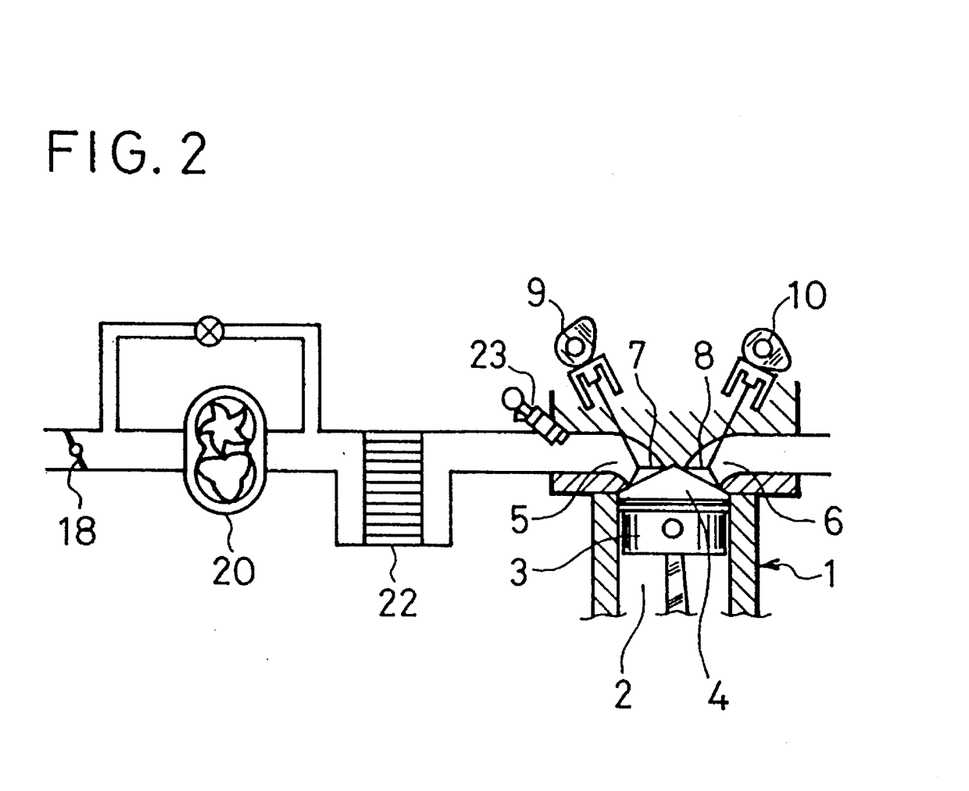
FIG. 2 is a schematic cross-sectional view of the supercharged engine.

Referring to the drawings in detail and, in particular, to FIGS. 1 and 2, it will be noted that these figures schematically show an engine 1, such as an internal combustion gasoline engine, equipped with a supercharger 20, both of which constitute essential elements of a power train in accordance with a preferred embodiment of the present invention. The engine 1, which has a high geometrical compression ratio or mechanical compression ratio (i.e., as determined by mathematical calculation from a fixed volume) of no less than 8.5, is equipped with a plurality of cylinders 2. In each of the cylinders 2, a combustion chamber 4 is formed above a piston 3 received in a cylinder bore. A plurality of intake ports 5, for instance, two, in this embodiment, open into the combustion chamber 4. Similarly, two exhaust ports 6 open into the combustion chamber 4. The total area of the openings of the intake ports 5 is designed and adapted to be larger than the total area of the openings of the exhaust ports 6. Each of the intake ports 5 and each of the exhaust ports 6 are opened and closed at an appropriate timing by an intake valve 7 and an exhaust valve 8, respectively.

A valve lifter that drives intake valves 7 and exhaust valves 8 has a pair of camshafts 9 and 10 for the intake valves and the exhaust valves, respectively, extending over a cylinder head (not shown). This valve lifter is of a direct drive double overhead camshaft type so that the intake valves 7 and the exhaust valves 8 are directly driven by cams formed integrally with the camshafts 9 and 10. In the center of the combustion chamber 4, a spark plug 11 is provided.

The engine 1 is provided with an intake passage 12 through which intake air is introduced into the engine 1 and which comprises a common intake route 13, forming an upstream part, and an intake manifold 14, forming a downstream part. The intake manifold 14 has discrete intake passages 15. A separate passage 15 is provided for each of the respective combustion chambers 4. Each of these discrete intake passages 15 is divided at the downstream end into two outlet passages in communication with the respective intake port 5. Each of the exhaust ports 6 is in communication with discrete exhaust passages 26 of an exhaust manifold 25.

The common intake passage 13 of the intake passage 12 is provided, in order from its inlet end, with an air cleaner 16, an air flow meter 17 for detecting the amount of intake air, and a throttle valve 18 that is operated by means of an accelerator pedal (not shown). Downstream from the throttle valve 18, a mechanical supercharger 20, which is preferably of an internal compression type, and, in the preferred embodiment, of a Lysholm type, is provided in the intake passage 12. This mechanical supercharger 20 is driven by a drive mechanism 21 linked to an engine crankshaft (not shown) via, for instance, a belt or the like. Downstream from the supercharger 20, an air-cooled intercooler 22 is provided in the intake passage 12. Either outlet passage of each discrete intake passage 15 is provided with an injector 24 that injects fuel into the combustion chamber 4. If necessary, it may be preferred to provide, in either outlet passage of each discrete intake passage 15, a switch valve 24 that closes in a region of low engine load.

The multi-valve, double overhead camshaft (DOHC) engine 1, equipped with the mechanical supercharger 20 thus structured, is linked with a power transfer line so as to form the power train. This power transfer line includes a transmission 31 connected to the output of the engine 1 and a terminal reduction gear 33, such as a differential or the like, connected to the transmission 31 via a drive shaft 32. Drive torque is transferred to wheels 35 of the vehicle via axle shafts 34 operationally connected to the terminal reduction gear 33. This power plant is installed in a passenger car. The tires of the wheels 35, which are of a general size used on passenger cars, have an effective radius of around 0.27–0.32 m.

The engine 1 may be of a type having only one of the intake ports for each cylinder and, in addition, may cooperate with valve lifters of a type other than a double overhead camshaft DOHC type, for instance, a type having a single overhead camshaft. However, as will be described below, it is desirable for the engine 1 to have a plurality of intake ports for each cylinder and to cooperate with valve lifters of a double overhead camshaft type for the purpose of reducing intake resistance during supercharging.

In a power train structured in this way, a specific relationship is provided among (1) an intake valve close (IC) time, (2) the overall reduction ratio of the power transfer line with the transmission 31 in the highest gear, i.e., at the smallest gear ratio, (3) the maximum speed for a maximum output (or a maximum horsepower) of the engine 1, and (4) the maximum volumetric output of the mechanical supercharger 20 as described below. Hereinafter, the term "overall reduction ratio" shall mean and refer to the overall reduction ratio of the power transfer line with the transmission 31 in the highest gear, i.e. at the smallest gear ratio, in other words, the reduction gear ratio that is a combination of the transmission gear ratios of the transmission 31 in the highest gear and the reduction ratio of the terminal reduction gear 33.

Figure 3:
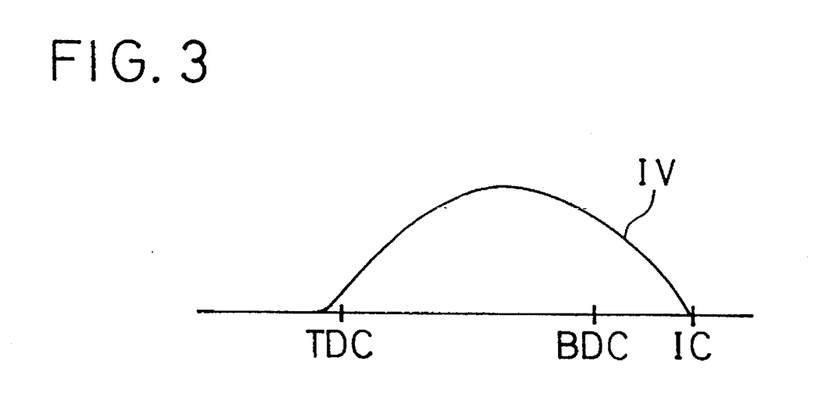
FIG. 3 is a timing diagram of opening and closing of intake valves.
Figure 4:
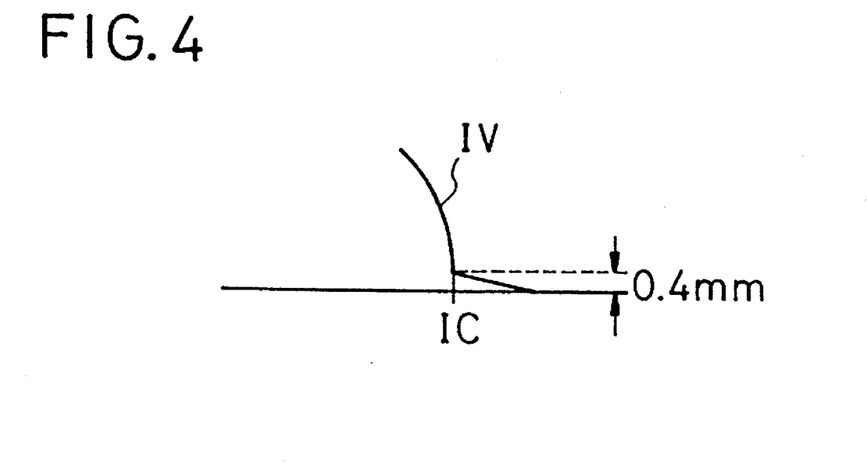
FIG. 4 is a diagram regarding the definition of closing timing of an intake valve.

FIG. 3 shows schematically intake valve opening and closing or valve lift. The intake valve 7 opens just before the piston reaches top dead center (TDC) on the power stroke and closes after bottom dead center (BDC) on the exhaust stroke. Specifically, the intake valve 7 closes at more than about 65 degrees, and preferably less than 100 degrees, after bottom dead center (BDC), which is large compared to regular engines. The term "intake close (IC) time" used herein means and refers to the time at which the intake valve can be considered to be substantially closed, for instance, the time at which the valve has closed as far as an extremely small lift corresponding to the height of a cam ramp or a cam lobe base of a cam of the valve lifter. In the present embodiment, the intake close (IC) time is taken at a valve lift of 0.4 mm as shown in FIG. 4.

The reason the intake valve close (IC) time is set larger than 65 degrees of crank angle after bottom dead center (BDC) is to adequately produce effects, such as knocking control and the like, due to lowering the temperature at top dead center (TDC) on the compression stroke as will be described later. The reason for limiting this time to less than 100 degrees of crank angle after bottom dead center (BDC), moreover, is because of concerns that intake valve close times larger than the limit angle provide a drop in the temperature at top dead center (TDC) on the compression stroke so that this temperature will fall below the limit required for ignition and cause difficulty in engine ignition.

When the power transfer line has an overall gear ratio between 2.1 and 2.8 and includes, for instance, a four speed automatic transmission with a gear ratio of about 0.7 in a fourth gear as the transmission 31, the terminal reduction ratio of the terminal reduction gear 33 is set between about 3° and 4.0. In addition, the engine 1 has a maximum speed for the maximum output set no greater than 6,000 rpm, and the mechanical supercharger 20 maximum output. Comparing these settings with conventional models of this type of power train equipped with, for instance, double overhead camshaft (DOHC) engines, which have a total reduction ratio of about 3.15 and a maximum engine speed for the maximum engine output of around 6,500 to 7,500 rpm, the power train of the present invention has a smaller overall reduction ratio and a lower maximum engine speed at maximum engine output.

With the power train of the present invention, knocking is controlled while engine output torque is boosted due to the intake valve closing (IC) time being more than 65 degrees after bottom dead center (BDC) and the provision of both mechanical supercharger 20 and intercooler 22. In other words, while intake air is forced by the supercharger 20 into the combustion chamber 4 after being cooled through the intercooler 22, and the effective compression ratio is smaller than the expansion ratio because of the retarded intake valve closing (IC) time, a drop in the temperature at top dead center (TDC) on the compression stroke is caused. In particular, when the geometrical or mechanical compression ratio of the engine 1 is above 8.5, which is higher than those of general engines equipped with superchargers which are approximately 7.5 to 8.5, the thermal efficiency is boosted while a gain in expansion ratio is attained. Additionally, the effective compression ratio drops appropriately due to the retardation of the intake valve closing (IC) time to no less than 65 degrees of crank angle after bottom dead center (BDC).

Through these effects, knocking during a high volume of supercharge and a rise in the temperature of exhaust gas is controlled and, in addition, an increase in engine output torque is provided because of the supercharge. Furthermore, when the supercharger 20 is of a mechanical type and, in particular, of a Lysholm internal compression type, supercharging pressure is sufficiently boosted even at relatively low engine speeds. In addition, a reduction in the intake air resistance during supercharging is provided when the engine is of a multiple intake valve type and, furthermore, is enhanced when it is of a double overhead camshaft type. That is, when the engine 1 has a plurality of intake ports 5 on each cylinder, the total area of the intake openings is large, so as to provide a reduction in the intake air resistance. When the engine 1 has both a plurality of intake ports 5 and a plurality of exhaust ports 6 on each cylinder and the total area of the intake port openings is larger than that of exhaust port openings, the reduction in the intake air resistance is enhanced even more. Furthermore, when the engine 1 is of a type having double overhead camshafts, freedom in laying or positioning the intake and exhaust valves is improved, so as to enable the intake ports and intake valves to have shapes and angles favorable to a reduction in the resistance of intake air flow at the intake port openings, thereby achieving a beneficial effect in terms of reducing intake air resistance during a high volume of supercharge. This leads to enhanced supercharging performance and a great increase in engine output supercharging performance and a great increase in engine output torque.

In this instance, the power train according to the present invention has an appropriately reduced overall reduction ratio and a lowered maximum engine speed for a maximum engine output while providing an increased output torque at low engine speeds. Consequently, this power train sustains favorable driving conditions while providing an improvement in fuel efficiency or economy, driving reliability, and quietness as will be described hereafter.

Figure 5:
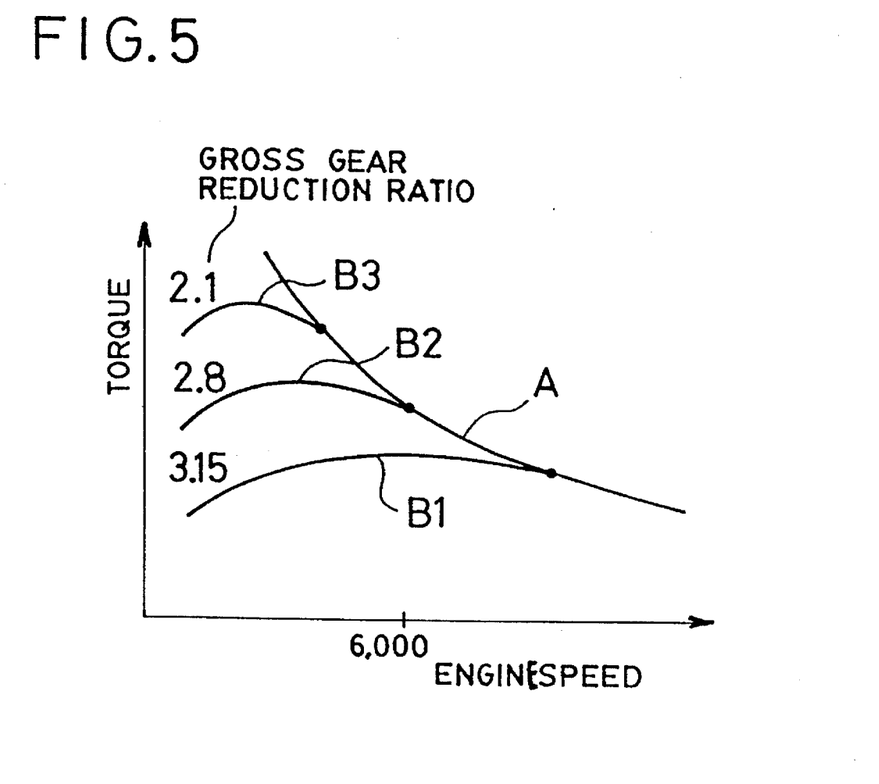
FIG. 5 is an iso-horsepower diagram relative to engine speed, and necessary torque and overall reduction ratio of the power transfer line with a transmission in the highest gear.

FIG. 5 shows lines B1, B2 and B3 representing engine torque needed to obtain a specified horsepower for various overall reduction ratios and an iso-horsepower line A corresponding to a required maximum horsepower. The required maximum horsepower is based on a maximum horsepower of a conventional power train equipped with a double overhead camshaft (DOHC) engine with a standard supercharger. More specifically, the power train includes a supercharged, double overhead camshaft (DOHC) engine, having an intake valve closing (IC) time which is not retarded and having a maximum speed for the maximum horsepower which is increased to a speed of approximately 7,500 rpm, which is a permissible speed from the standpoint of reliability and the like, and has an overall reduction ratio of around 3.15. The torque necessary to achieve such a maximum horsepower around this level is represented by line B1 for an overall reduction ratio of 3.15, by line B2 for an overall an overall reduction ratio of 2.1. The range of necessary torque is defined between lines B2 and B3 for the range of overall reduction ratios (2.1–2.8) of the power train according to the present invention. Line B1 shows the necessary torque for an overall reduction ratio of the conventional power train.

It is apparent in FIG. 5 that, as the overall reduction ratio decreases, the necessary torque is increased and the maximum engine speed for a required maximum horsepower decreases. When the overall reduction ratio is no greater than 2.8, the maximum engine speed is no greater than 6,000 rpm. In regular engines with superchargers in which the intake valve closing (IC) time is not retarded, an increase in output torque is limited because of knocking and, consequently, it is difficult to increase the engine output torque to the necessary torque when the overall reduction ratio is no greater than 2.8. However, in the power train of the present invention, which includes the engine 1 with the mechanical supercharger 20 having a retarded intake valve closing (IC) time, the engine output torque is sufficiently increased so that the necessary torque is attained even for overall reduction ratios less than 2.8.

Double overhead camshafts are used in conventional models of high speed engines having maximum engine speeds for a required maximum horsepower greater than 6,500 rpm in order to reduce inertia of related valve lifters. In contrast, in the power train of the present invention, double overhead camshafts are used in order to reduce intake air resistance so that, although used in order to reduce intake air resistance so that, although the engine of the power train is of a double overhead camshaft (DOHC) type, it has a maximum engine speed for required maximum horsepower of less than 6,000 rpm. The engine horsepower follows the volume of charge from the supercharger, and the maximum volume of charge from the supercharger 20 is adapted so as to provide the required maximum horsepower of the engine 1.

Figure 6:
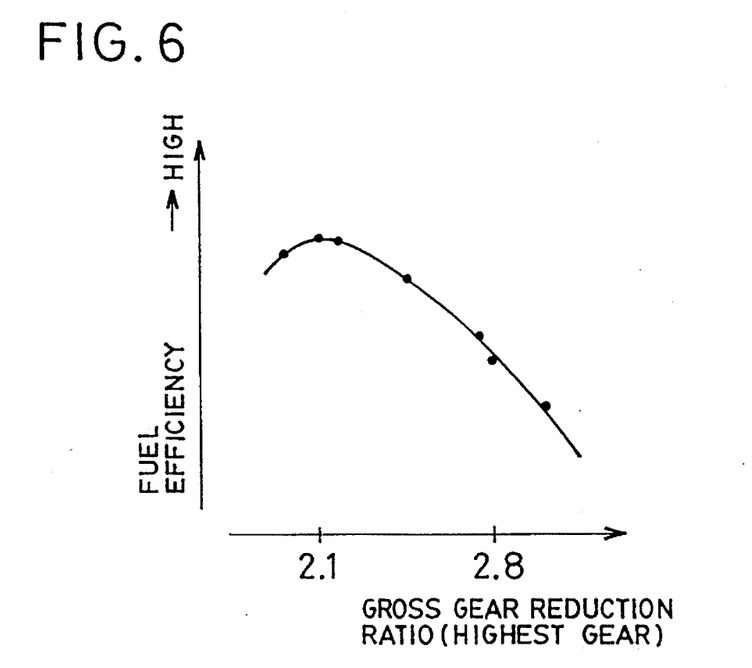
FIG. 6 is a diagram showing the relationship between fuel efficiency and overall gear ratio of the power transfer line with the transmission in the highest gear.
Figure 7:
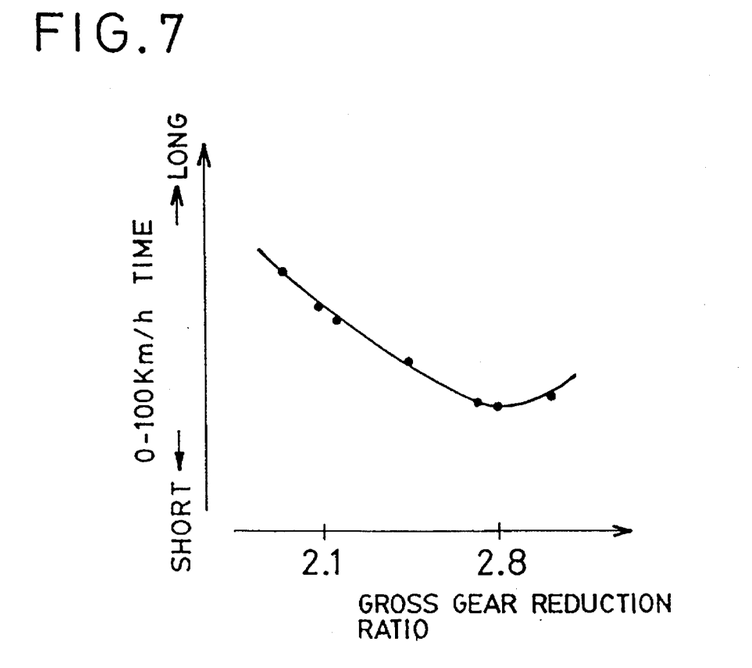
FIG. 7 is a diagram showing the relationship between time needed for acceleration to 100 km/h and overall gear ratio of the transfer line with the transmission in the highest gear.

When the necessary torque is produced corresponding to the overall reduction ratios so as to attain the equivalent required maximum horsepower in the manner described above, the relationship between overall reduction ratio and fuel efficiency or economy is given as shown in FIG. 6, and the relationship between overall reduction ratio and time needed to accelerate the vehicle from 0 to 100 km/h is given as shown in FIG. 7. The acceleration time is indicative of the feeling of driving the vehicle, with better driving feeling indicated by shorter times.

Improvements in fuel economy and starting acceleration performance brought by the power train of the present invention will be described hereafter.

Figure 9:
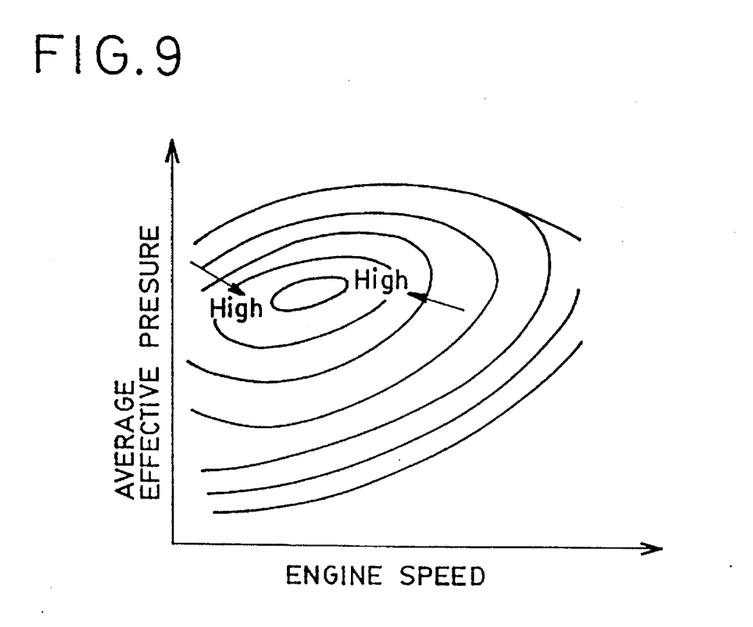
FIG. 9 is an iso-fuel economy diagram.

As shown in FIG. 6, the fuel economy is variable. That is, the fuel economy is poorer on the side of large overall reduction ratios, improves to a certain point as the overall reduction ratio decreases, and tends to worsen as the overall reduction ratio becomes smaller. The best fuel economy is attained at an overall reduction ratio of around 2.1. The reason for this is explained with reference to FIG. 9, which shows iso-fuel economy lines with respect to driving conditions. As indicated by the iso-fuel economy lines, the fuel economy is best in a region of relatively high engine speeds and low engine loads. If the engine is used in a conventional power train, it is frequently driven at higher speeds which are out of the best or peak fuel economy region of speeds. However, the engine reduces the frequently used engine speed with a decline in the overall reduction ratio and approaches speeds of the best fuel economy region. More specifically, as shown in FIG. 5, the power train of the present invention provides an overall reduction ratio smaller than that of the conventional models indicated by line B1 and attains, through supercharging, a torque required to be higher accompanying the decline in overall reduction ratio. Driving conditions needed to provide an equivalent driving performance (which mean a driving performance under the same horsepower and vehicle acceleration) shift toward the side of lower speeds and higher torque as compared to the conventional power trains. Accordingly, a region of normal driving, in which driving is frequently performed, shifts toward the side of lower speeds and higher torque, reaching the best fuel economy region shown in FIG. 9. Consequently, fuel economy is improved. However, if the overall gear ratio is made excessively small, fuel economy worsens because the engine is driven at low engine speeds which are out of the peak fuel economy region.

Figure 10:
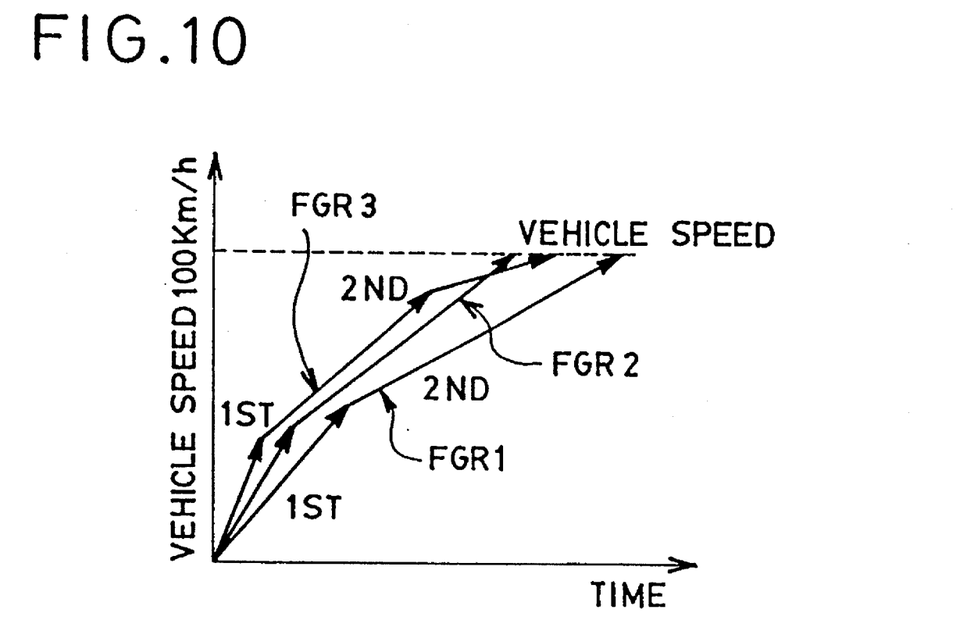
FIG. 10 is a diagram regarding necessary acceleration time.

In addition, as shown in FIG. 7, the required time for acceleration is longer on the side of lower overall reduction reduction ratio is increased, and tends to become longer as the overall reduction ratio is further increased. It is shortest at an overall reduction ratio of around 2.8. The causes are revealed by reviewing FIG. 10, which shows how the increasing speed of a vehicle, caused by acceleration, changes in accordance with changes in terminal reduction ratio to which the overall reduction ratio relates and shows schematically changes in vehicle speed from 0 to 100 km/h during maximum acceleration for terminal reduction ratios of the same terminal reduction gear, namely FGR1, FGR2 and FGR3 (FGR1<FGR2 <FGR3). As is apparent from FIG. 10, when the terminal reduction ratio changes from FGR1 to FGR2, when the number of gear shifts is the same, as the terminal reduction ratio becomes larger, the rising of vehicle speed is faster, making the acceleration time shorter. When the terminal reduction ratio further changes to FGR3, the number of gear shifts increases and the acceleration time is made longer because of time loss during an increased number of gear shifts and because of a drop in acceleration performance in the highest gear. For these reasons, as compared with the conventional models, the power train of the present invention boosts starting acceleration performance.

Figure 8:
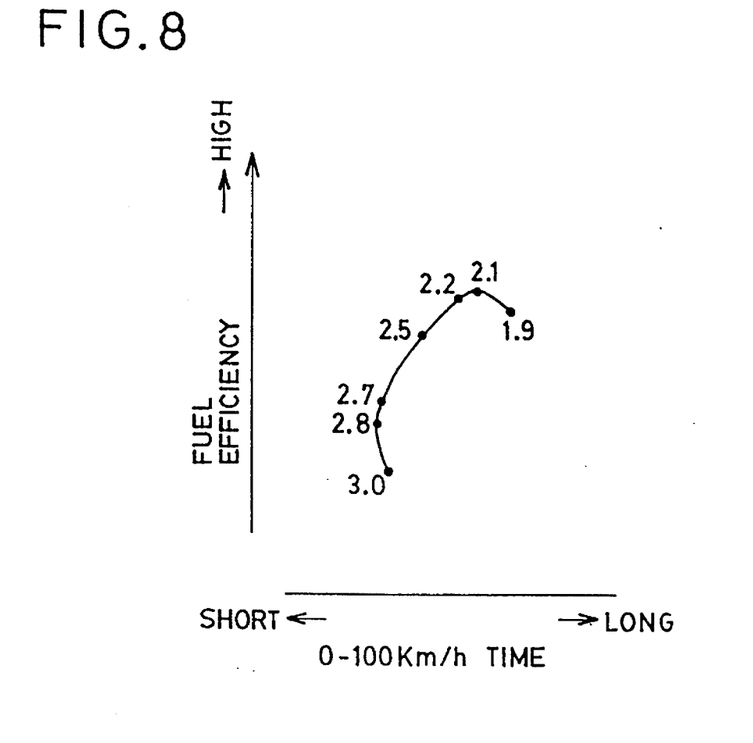
FIG. 8 is a combined diagram of FIGS. 6 and 7.

FIG. 8 shows the relationships between fuel economy and acceleration time that are shown relative to the overall reduction ratio in FIGS. 6 and 7, respectively. In the range of overall reduction ratios between 2.1 and 2.8, either driving feeling or fuel economy improves with changes in the overall reduction ratio. However, when the overall reduction ratio becomes larger than 2.8 or smaller than 2.1, both driving feeling and fuel economy tend to worsen. Accordingly, overall reduction ratios between 2.1 and 2.8 are effective for both fuel economy and starting acceleration performance.

Figure 11:
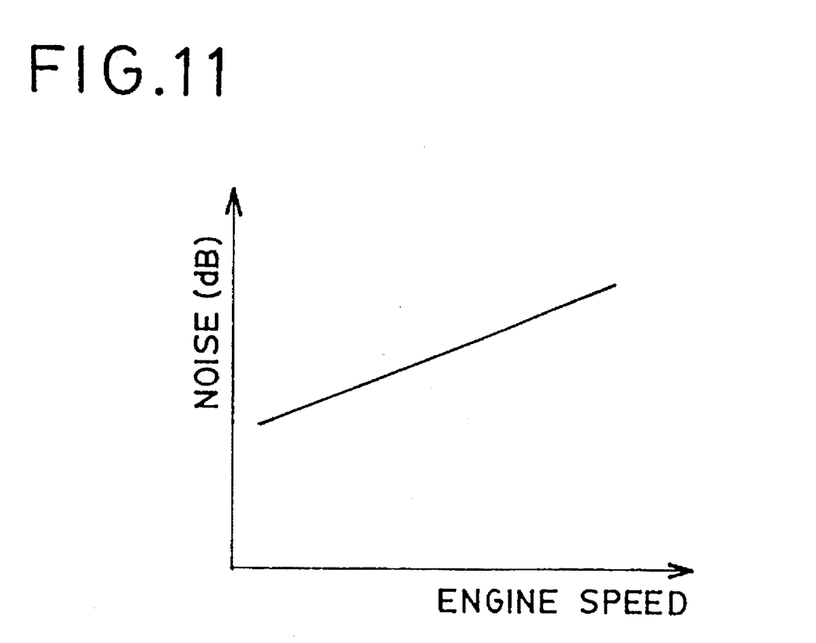
FIG. 11 is a diagram showing the relationship between noise and engine speed.

FIG. 11 shows the relationship between engine speed and noise. It is clear that noise increases with a rise in engine speed. Accordingly, a decreased overall reduction ratio and a lowered maximum engine speed for a maximum horsepower makes normal engine speed smaller, providing enhanced engine quietness. Furthermore, the lowered maximum engine speed, and hence the lowered maximum speed of the supercharger, improves the reliability of both the engine 1 and the supercharger 20. It is desirable, in terms of fuel economy and engine output, for the engine 1 to have a displacement between around 2,000 and 2,500 cc. When the engine 1, having even this level of displacement, is supercharged, it is powerful as compared to non-supercharged engines having a displacement of around 3,000 cc. One example of preferred specifications of the power train of the present invention is outlined below.

| Transmission (automatic transmission) | |
| --- | --- |
| Gear ratio in first gear: | 2.785 |
| Gear ratio in second gear: | 1.545 |
| Gear ratio in third gear: | 1.000 |
| Gear ratio in fourth gear: | 0.694 |
| Final reduction gear ratio: | 3.805 |
| Engine displacement: | 2,254 cc |
| Cylinder bore × stroke: | 80.3 mm × 74.2 mm |
| Maximum engine output: | 220 ps/5,550 rpm |
| Maximum output torque: | 30 kgf.m/3,500 rpm |

In addition, the generally known equations relating to dynamic characteristics are shown below.

Axle output: He $$He = \{(Pe \cdot Vn \cdot N)/4.5 \times 10^5)\} \cdot e = Te \cdot N/716.2$$

Pe: Average effective pressure
Vn: Total engine displacement
N: Engine speed in rpm.
e: Engine cycle coefficient (which is, for instance, 0.5 for 4 cycle engines)
Axle torque: Te $$Te = \{(Pe \cdot Vn)/(200 \cdot \pi)\} \cdot e = 716.2 \cdot He/N$$

Driving force: F $$F = Te \cdot i_j \cdot FGR \cdot \eta_j / r$$

$i_j$: Transmission gear ratio (j=1, 2, 3, ...)
FGR: Terminal reduction ratio $\eta_j$: Driving force transfer efficiency (j=1, 2, 3, ...)
r: Effective tire radius As indicated by the above equations, the driving force F is related to the axle torque Te, transmission gear ratio $i_j$, terminal reduction ratio FGR, driving force transfer efficiency $\eta_j$, and effective tire radius r. In order to attain a certain fixed driving force, if the effective tire radius r is small, the axle torque and/or the overall reduction ratio should be made smaller, and if it is large, they should be made larger. However, effective radii of tires used on various passenger cars fall within the range of around 0.26 to 0.32 m, as shown in the following Table. As long as the power train specifications are defined as described above and the effective tire radius is within the range of 0.26 to 0.32 m, the necessary driving force is attained, providing certain or sure driving performance.

The power train of the present invention is adapted to have an overall reduction ratio in the range of 2.1 to 2.8, smaller than those of the conventional models, for the highest transmission gear so as to provide a maximum engine speed, for maximum torque, which is reduced to less than 6,000 rpm. while enabling the supercharged engine to put out boosted torque due to a retardation of closing the intake valves which is larger than 65 degrees after bottom dead center. The power train, thus structured, provides a secured output and improved driving performance, including starting acceleration, while greatly improving fuel economy, enhancing the reliability of both the engine and the supercharger, and further reducing noises.

It is to be understood that although the present invention has been described in detail with respect to a preferred embodiment thereof, nevertheless, various other embodiments and variants may occur to those skilled in the art which are within the spirit and scope of the invention. Such other embodiments and variants are intended to be covered by the following claims.

What is claimed is:

1. In a power train including an engine, which is equipped with an internal compression type of a mechanical supercharger driven by said engine and an intercooler disposed in an intake line, and a power transfer line, including a transmission operationally connected to said engine, the improvement comprising:

said engine (1) having a maximum output provided according to a maximum volume of supercharge of said mechanical supercharger, (2) including an intake valve closing at a timing retarded more than 65 degrees of a crank angle after bottom dead center on an intake stroke, (3) having a maximum speed for said maximum output of less than 6,000 rpm, and (4) having a geometric compression ratio greater than 8.5; and said power transfer line having an overall reduction ratio between 2.1 and 2.8 for a highest gear of said transmission.

2. In a power train as defined in claim 1, the improvement further comprising:

said engine having an engine displacement of less than approximately 2,500 cc.

3. In a power train as defined in claim 2, the improvement further comprising:

said engine being provided with a plurality of intake ports on each cylinder.

4. In a power train as defined in claim 3, the improvement further comprising:

said engine being further provided with a plurality of exhaust ports on each cylinder, with a total opening area of said intake ports being larger than that of said exhaust ports.

5. In a power train as defined in claim 4, the improvement further comprising:

said engine being of a double overhead camshaft type.

6. In a power train as defined in claim 5, the improvement further comprising:

TABLE

| | Passenger car tire size | | | Tire | Effective |
| --- | --- | --- | --- | --- | --- |
| | Width (cm) | Aspect ratio (H/W in section) | Rim diameter (in) | Radius R (cm) | Radius r = 0.96.R |
| Max. | 215 | 65 | 15 | 33.0 | about 32 |
| Min. | 155 | 65 | 13 | 26.6 | about 26 | said transmission having a gear ratio of less than 1.0 for said highest gear.

7. In a power train as defined in claim 1, the improvement further comprising:
said engine being of a double overhead camshaft type.

8. In a power train as defined in claim 1, the improvement further comprising:
said engine being provided with a plurality of intake ports on each cylinder.

9. In a power train as defined in claim 7, the improvement further comprising:
said engine being further provided with a plurality of exhaust ports on each cylinder, with a total opening area of said intake ports being larger than that of said exhaust ports.

10. In a power train as defined in claim 1, the improvement further comprising:
said engine having an engine displacement of less than approximately 2,500 cc.

11. In a power train as defined in claim 10, the improvement further comprising:
said engine being provided with a plurality of intake ports on each cylinder.

12. In a power train as defined in claim 11, the improvement further comprising:
said engine being further provided with a plurality of exhaust ports on each cylinder, with a total opening area of said intake ports being larger than that of said exhaust ports.

13. In a power train as defined in claim 10, the improvement further comprising:
said transmission having four forward gears having a gear ratio of 4:2:1.4:1.

14. In a power train as defined in claim 1, the improvement further comprising:
said engine being provided with a plurality of intake ports on each cylinder.

15. In a power train as defined in claim 14, the improvement further comprising:
said engine being further provided with a plurality of exhaust ports on each cylinder, with a total opening area of said intake ports being larger than that of said exhaust ports.

16. In a power train as defined in claim 15, the improvement further comprising:
said engine being of a double overhead camshaft type.

17. In a power train as defined in claim 1, the improvement further comprising:
said transmission having a gear ratio of less than 1.0 for said highest gear.

18. In a power train as defined in claim 17, the improvement further comprising:
said transmission having four forward gears having a gear ratio of 4:2:1.4:1.

19. In a power train as defined in claim 1, the improvement further comprising:
said transmission having four forward gears having a gear ratio of 4:2:1.4:1.

20. In a power train as defined in claim 1, the improvement further comprising said mechanical supercharger being of a Lysholm type.

21. In a power train including an engine, which is equipped with a Lysholm type of a mechanical supercharger driven by said engine and an intercooler disposed in an intake line, and a power transfer line, including a transmission operationally connected to said engine, the improvement comprising:
said engine including an intake valve closing at a timing retarded more than 65 degrees of a crank angle after bottom dead center on an intake stroke and a relatively high geometric compression ratio greater than 8.5; and
said power transfer line having a relatively small overall reduction ratio between 2.1 and 2.8 for a highest gear of said transmission.

22. In a power train as defined in claim 21, the improvement further comprising said engine being provided with a plurality of intake ports on each cylinder.

23. In a power train as defined in claim 22, the improvement further comprising said engine being further provided with a plurality of exhaust ports on each cylinder, with a total opening area of said exhaust ports smaller than that of said intake ports.

24. In a power train as defined in claim 23, the improvement further comprising said engine being of a double overhead camshaft type.

25. In a power train as defined in claim 24, the improvement further comprising said transmission having a gear ratio of less than 1.0 for said highest gear.

26. In a power train as defined in claim 25, the improvement further comprising said transmission having four forward gears having a gear ratio of 4:2:1.4:1.

* * * * *